UNITED STATES PATENT OFFICE.

WILLIAM A. TORREY, OF MONT CLAIR, NEW JERSEY.

IMPROVEMENT IN VULCANIZED RUBBER COMPOUNDS.

Specification forming part of Letters Patent No. 137,509, dated April 1, 1873; application filed March 29, 1873.

*To all whom it may concern:*

Be it known that I, WM. A. TORREY, of Mont Clair, in the county of Essex and State of New Jersey, have made a new and useful Improvement in Vulcanized Rubber Compounds; and I hereby declare the following to be a full and exact description of the same.

The object of this invention is to render vulcanized rubber compounds more durable; and it consists in combining mica with these compounds as ordinarily made for steam-packing, belting, hose, piston-valves, and for other uses where it is required to produce a very durable rubber compound.

Heretofore in the manufacture of rubber compounds it has been usual to combine with the rubber various earths and oxides, such as clay, chalk, soap-stone, marble-dust, oxide of lead, tin, and various pigments, for the purpose of changing the color. These compounds add to the bulk and cheapen the product; but, with the exception of some special uses, deteriorate the compound.

From the peculiar properties of mica it may be added to the various compounds of rubber and sulphur, or of gutta-percha and sulphur, without impairing the resulting rubber compound, since the mica itself is not at all affected by either rubber or sulphur, or by the heat required to vulcanize. In fact, any heat to which the rubber compound may be subjected in use will not affect the mica, and the mica protects the rubber compound especially against the action of steam and chemical compounds, as in packing-valves and the like.

In carrying out this invention the vulcanizing compound of gum and sulphur is prepared in the usual manner for the purpose for which it is intended. These matters, being well known and understood by those skilled in the art, need not be particularly described.

Mica in dust, powder, or in scales is incorporated with the mass and the whole vulcanized together. The proportion of mica varies greatly with the article to be made. For steam-packing and valves it may equal the amount of rubber; but I do not limit myself to proportions, as the mica may be used to replace wholly or in part the various earths and oxides heretofore used to give body to compounds of vulcanized rubber.

Instead of using raw rubber, gutta-percha, or other gums, waste rubber, asphaltum, tar, shellac, linseed, and other drying vegetable oils may be employed in the manner already used in rubber manufacture, and the addition of a suitable quantity of mica will impart the hardness and toughness which it is the object of this invention to give.

Having thus described my invention, what I claim and desire to secure by Letters Patent of the United States, is—

The improved rubber compound herein described, made by combining mica with rubber or other equivalent gum and vulcanizing, as set forth.

WILLIAM A. TORREY.

Witnesses:
J. W. YOUNG,
WILKINS SCHENCK.